United States Patent [19]
Anderson et al.

[11] Patent Number: 6,104,604
[45] Date of Patent: *Aug. 15, 2000

[54] MODULAR KEYBOARD

[75] Inventors: Glen J. Anderson; Karla A. Radle, both of Sioux City, Iowa

[73] Assignee: Gateway 2000, Inc., North South City, S. Dak.

[*] Notice: This patent issued on a continued prosecution application filed under 37 CFR 1.53(d), and is subject to the twenty year patent term provisions of 35 U.S.C. 154(a)(2).

[21] Appl. No.: 09/003,575

[22] Filed: Jan. 6, 1998

[51] Int. Cl.[7] .............................. H05K 5/02; G06F 1/16
[52] U.S. Cl. .......................................... 361/680; 400/479
[58] Field of Search ..................... 361/680, 681, 361/683; 400/479, 489, 492, 493; 364/708.1

[56] References Cited

U.S. PATENT DOCUMENTS

| | | | |
|---|---|---|---|
| 4,488,146 | 12/1984 | Burchart . | |
| 4,564,751 | 1/1986 | Alley et al. | 235/146 |
| 4,739,451 | 4/1988 | Kuba | 361/394 |
| 5,144,302 | 9/1992 | Carter et al. | 314/20 |
| 5,187,644 | 2/1993 | Crisan | 361/393 |
| 5,264,992 | 11/1993 | Hogdahl et al. | 367/681 |
| 5,510,953 | 4/1996 | Merkel | 361/680 |
| 5,519,569 | 5/1996 | Sellers | 361/680 |
| 5,526,493 | 6/1996 | Shu | 395/281 |
| 5,561,589 | 10/1996 | Mesfin et al. | 361/686 |
| 5,568,359 | 10/1996 | Cavello et al. | 361/686 |
| 5,576,929 | 11/1996 | Uchiyama et al. | 361/680 |
| 5,615,081 | 3/1997 | Ma | 361/680 |
| 5,661,633 | 8/1997 | Patret | 361/683 |
| 5,865,546 | 2/1999 | Ganthier et al. | 400/489 |

OTHER PUBLICATIONS

"Japanese Patent Abstract", vol. 013, No. 172 (P–862) & JP 01 007212 A (Toshiba Corp). Title: *Personal Work Station*, Publication number 01007212; Application date Jun. 30, 1987, (Jan. 11, 1989).

"Japanese Patent Abstract", vol. 097, No. 006 & JP 09 054640 A, Fuji Xerox Co. Ltd. Title: *Keybroard Device and Key Unit Therefor*, Publication number 09054640; Application number Aug. 18, 95, (Feb. 25, 1997).

"Japanese Patent Abstract vol. 017, No. 277", (P–1546) & JP 05 011885 A (Hitachi Ltd.) Title: *Information Processor*, Publication number 05011885; application date Mar. 7, 91, (Jan. 22, 1993).

"Patent Abstracts of Japan", vol. 096 No. 008 & JP 08 087349 A (Tec Corp) Title: *Portable Computer Device*, Publication number 08087349; Application date Sep. 16, 1994, (Apr. 2, 1996).

*Primary Examiner*—Benjamin R. Fuller
*Assistant Examiner*—Jagdish Patel
*Attorney, Agent, or Firm*—Schwegman, Lundberg, Woesner & Kluth, P.A. & Anthony Claiborne

[57] ABSTRACT

A modular keyboard is provided which can be repeatedly and conveniently transferred between a portable computer or a desktop computer without damage to the modular keyboard. Both the portable computer and the keyboard base for the desktop computer have a cavity therein for receiving the modular keyboard. The keyboard base has a numerical keypad and arrow keys adjacent the cavity. The modular keyboard is small enough so that the portable computer can be closed and carried in the conventional manner without interference from the modular keyboard. A removal mechanism is provided on each the portable computer and the keyboard base to facilitate removal of the modular keyboard.

7 Claims, 4 Drawing Sheets

MODULAR KEYBOARD

FIELD OF THE INVENTION

The present invention relates generally to computers. More particularly, it pertains to keyboards for use with multiple computers.

BACKGROUND OF THE INVENTION

Conventional keyboards provided in portable or notebook computers have a different key layout and fewer available options compared to desktop keyboards due to space constraints imposed by the need to minimize the footprint of such computers. Many computer users often switch between using a desktop computer having a standard non-integrated keyboard and a notebook keyboard. The problem with switching between two keyboard configurations is that learning which occurs for one keyboard configuration may actually interfere with learning a second keyboard. What often happens is that the user operates a desktop personal computer (PC) or connects a desktop keyboard to the notebook whenever possible and never fully becomes comfortable with use of the notebook keyboard. When traveling, the use of a desktop keyboard with a portable computer is very inconvenient, and would otherwise defeat the portability of the portable computer.

The conventional desktop keyboard is relatively large compared to the notebook computer, and is bulky to tote from one location to another As the user continues to switch back and forth, usage of the desktop keyboard interferes with learning the notebook keyboard.

One approach to solve the above is shown in U.S. Pat. No. 5,187,644 issued to Crisan on Feb. 16, 1993. The Crisan reference teaches a compact portable computer having an expandable full size keyboard with extendable supports. The extendable flaps extend the keyboard surface to more closely approximate a full size keyboard. Another approach is shown in U.S. Pat. No. 5,519,569 issued to Sellers on May 21, 1996. In Sellers, a compact notebook computer having a foldable and collapsible keyboard structure is disclosed. Yet another approach is disclosed in U.S. Pat. No. 5,615,081 issued to Ma on Mar. 25, 1997. In Ma, a portable computer having keyboard structure including two sub-keyboards mounted for rotation between a longitudinally aligned position and mutually parallel position is shown. However, these references require part of the keys to remain substantially unsupported when the flaps are unfolded and extended away from the housing of the portable computer. In addition, although the surface area of the keystroke surface is increased, the resiliency of the keys is much different than a desktop keyboard. These differences, as well as others, force a user to adjust when switching between use of a keyboard on a portable computer, and a desktop keyboard.

Accordingly, what is needed is a keyboard similar in feel and look to a user for use with both a portable computer and a desk top computer. What is further needed is a keyboard which is easy to use and provides the functionality of a full size keyboard.

SUMMARY OF THE INVENTION

A portable modular keyboard is provided which is easily transferable between a portable computer and a keyboard assembly used with desktop computers. A portable computer and a keyboard base for a desktop computer are each provided with a cavity and a port for receiving and coupling with the modular keyboard, respectively, allowing a user to use the same keyboard for both portable computers and desktop computers. To conveniently remove the modular keyboard from either the portable keyboard or the modular keyboard base, a removal mechanism is provided. In one embodiment, a latch assembly is provided adjacent the cavity for either the portable computer of the keyboard base to facilitate the removal of the modular keyboard. In another embodiment, the modular keyboard and the cavity of each the portable computer and the keyboard base are sized such that there is an interference fit between the modular keyboard and the cavity to retain the modular keyboard therein.

A modular keyboard has keys such as those provided in a standard portable keyboard layout, which are resiliently coupled with a top surface of the modular keyboard. A bottom surface of the modular keyboard has a substantially rigid backing such that the modular keyboard can be removed from the portable computer and the keyboard base without damage. The backing also provides protection and support for the keys which are resiliently mounted to the backing. Also coupled with the modular keyboard is a connector for operatively coupling the modular keyboard with either the portable computer or the keyboard base.

Advantageously, the modular keyboard is light weight and is compatible with both the notebook and desktop computer. The modular keyboard fits within the portable computer, such that the housing of the portable computer can be closed over the keyboard, and the keyboard can be easily toted within the portable computer. In addition, the keyboards provided with either the desktop computer or the portable computer could be customized for customers, yet operable with many different types of computers. This keyboard design would allow notebook users to keep their entire notebook layout when switching to a desktop keyboard, also providing the benefit of having to purchase only one keyboard. A user could maintain the learning of the notebook keyboard to a greater extent because the keys used for standard typing tasks are in the same place for the desktop computer and the portable computer. In addition, the resilient nature of the keys remain consistent regardless of the device used. The modular keyboard provides a further benefit since a user could remove the keyboard to prevent unauthorized use of the computer, such as for sending an E-mail.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
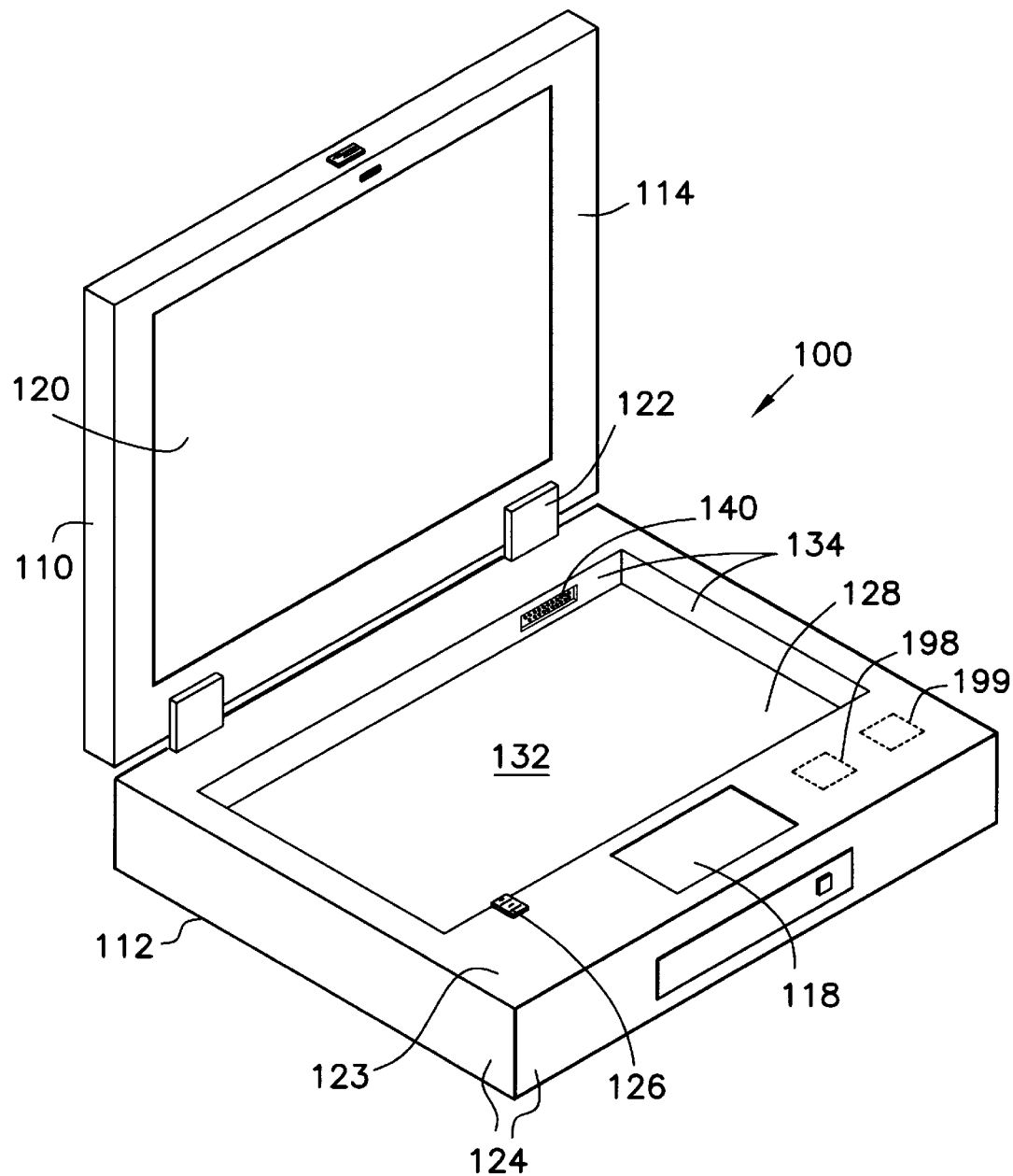
FIG. 1 is a perspective view illustrating a portable computer constructed in accordance with one embodiment of the present invention.

FIG. 1 illustrates a portable computer 100 constructed in accordance with one embodiment of the present invention. The portable computer 100 has a system board with a processor 198, memory 199 and various further integrated circuits for providing video graphics, sound functions, and I/O ports. Alternatively, the portable computer 100 could further include secondary memory devices such as floppy and hard disk drives and CD capabilities. The portable computer 100 includes a wide range of devices ranging from, in one embodiment, a luggable computer to a personal digital assistant (PDA). The portable computer 100 also has a lower chassis 112, and in one embodiment also an upper chassis 110.

The upper chassis 110, generally having the shape of a rectangular panel in one embodiment, has a bezel 114, which is integral with the upper chassis 110. Alternatively, the upper chassis 110 can have other shapes. In one embodiment, the bezel 114 encompasses a display 120 therein. The display 120 is an LCD screen or other equivalent, as known by those skilled in the art. In one embodiment, the bezel 114 and the display 120 of the upper chassis 110 pivot about a display hinge 122, providing adjustability for the display 120. The display hinge 122 connects the lower chassis 112 of the portable computer 100 with the upper chassis 110, and allows for the upper chassis 110 to be closed upon the lower chassis 112. Alternatively, the upper chassis 110 can be removably coupled with the lower chassis 112.

The loser chassis 112 is generally rectangularly shaped and is formed from a substantially rigid material, and is defined in part by a top surface 123 and side surface 124. The terms "top" and "side" are arbitrary and are used herein merely to describe relative surfaces of the lower chassis 112, but are not intended to limit the orientation of the lower chassis 112 in any manner. The lower chassis 112, in one embodiment, also includes a graphical pointing device 118, such as a touch pad or a roller ball apparatus. The top surface 122 of the lower chassis 112 has a cavity 128 therein.

The cavity 128 is shaped and sized to receive a modular keyboard 200 therein, as will be further discussed below. The cavity 128 is defined in part by a bottom surface 132 and side surfaces 134. Disposed within the cavity 128 is a connector 140 for coupling with the modular keyboard 200. The connector 140, in one embodiment, is disposed on a side surface 134 of the cavity 128. In another embodiment, the lower chassis 112 further includes a removal mechanism 126.

The removal mechanism 126 facilitates the removal and insertion of the modular keyboard 200 from the cavity 128. The removal mechanism 126 comprises, in one embodiment, straps which remain under the modular keyboard 200 or a notch for finger insertion. In another embodiment, the removal mechanism 126 comprises a latch assembly which engages the modular keyboard 200 and retains it within the cavity 128 until the latch assembly is released. Alternatively, the latch assembly can have a number of other configurations.

Figure 2:
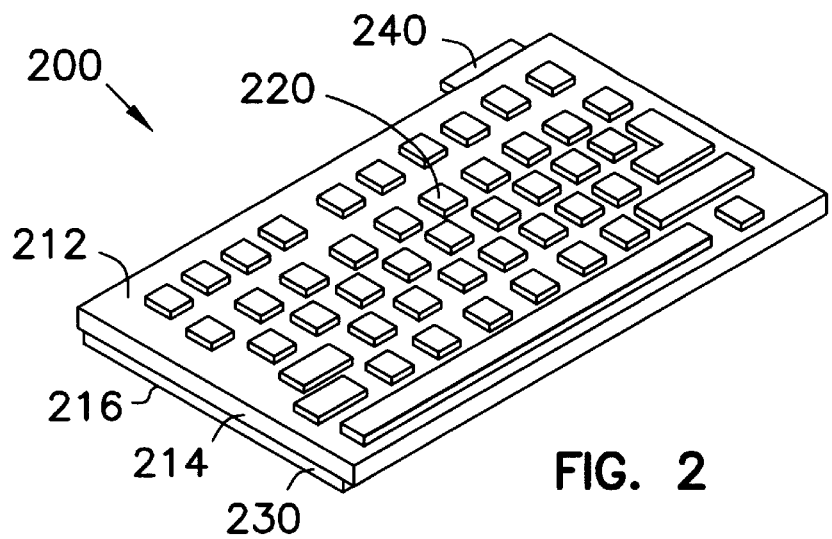
FIG. 2 is a perspective view illustrating a modular keyboard constructed in accordance with the one embodiment of the present invention.

FIG. 2 illustrates one embodiment of the modular keyboard 200. The modular keyboard 200 is generally rectangularly shaped, which corresponds to the shape of the cavity 128 of the portable computer 100. (FIG. 1). The modular keyboard 200 is defined in part by a top surface 212, side surfaces 214, and a bottom surface 216. In one embodiment, a connector 240 is coupled with one of the side surfaces 214. Alternatively, the connector 240 can comprise a wide variety of connectors such as standard plastic connectors, a card edge connector, or a ZIF connector and be coupled with alternative surfaces, such as the bottom surface 216. In another configuration, the connector 240 is tapered to facilitate connection when the modular keyboard 200 is operatively coupled with either the portable computer 100 or the keyboard base 300. Coupled with at least a portion of the top surface 212 of the modular keyboard 200 is a plurality of keys 220. In one embodiment, the plurality of keys 220 cover the entire top surface 212. The plurality of keys 220 are resiliently coupled with the top surface 212 as on conventional portable computers. In addition, in another embodiment, the portable keyboard 200 does not have a keyboard controller therein.

The bottom surface 216 of the modular keyboard 200 is comprised of a substantially rigid support structure 230 which is sized to fit within the cavity 128 of the portable computer 100. The support structure 230 is rigid enough so that the modular keyboard 200 can be repeatedly inserted into and removed from the cavity 128 of the portable computer 100 or a keyboard base without damage to the modular keyboard 200.

Figure 3:
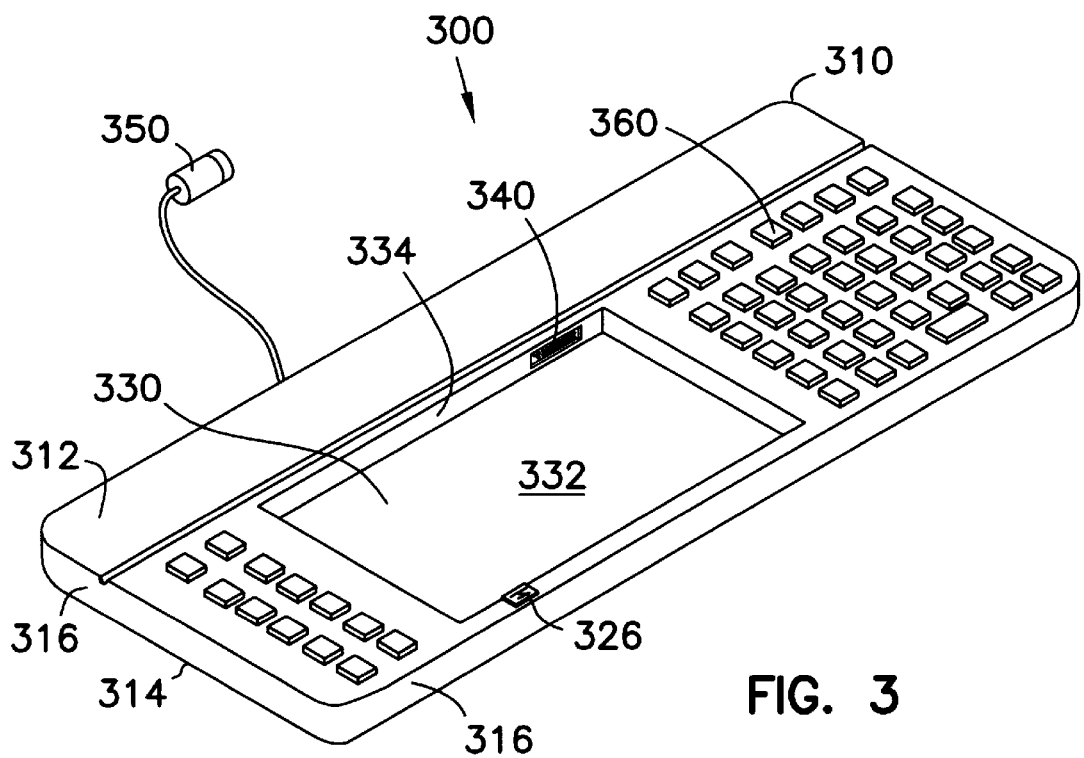
FIG. 3 is a perspective view illustrating a keyboard base constructed in accordance with one embodiment of the present invention.

FIG. 3 illustrates one embodiment of a desktop keyboard base 300 which has a keyboard body 310 defined by a top surface 312, a bottom surface 314, and side surfaces 31 6. The terms "top", "bottom" and "side" are arbitrary and are used herein merely to describe relative surfaces of the desktop base 300, but are not intended to limit the orientation of the desktop base 300 in any manner. In one embodiment, the top surface 312 of the keyboard body 310 has a cavity 330 therein. The cavity 330 is sized and adapted to receive the modular keyboard 200 therein as will be further discussed below. The cavity is defined in part by a bottom surface 332 and side surfaces 334. The bottom surface 314 of the keyboard body 310 rests upon a desk or other generally flat work surface.

Figure 5:
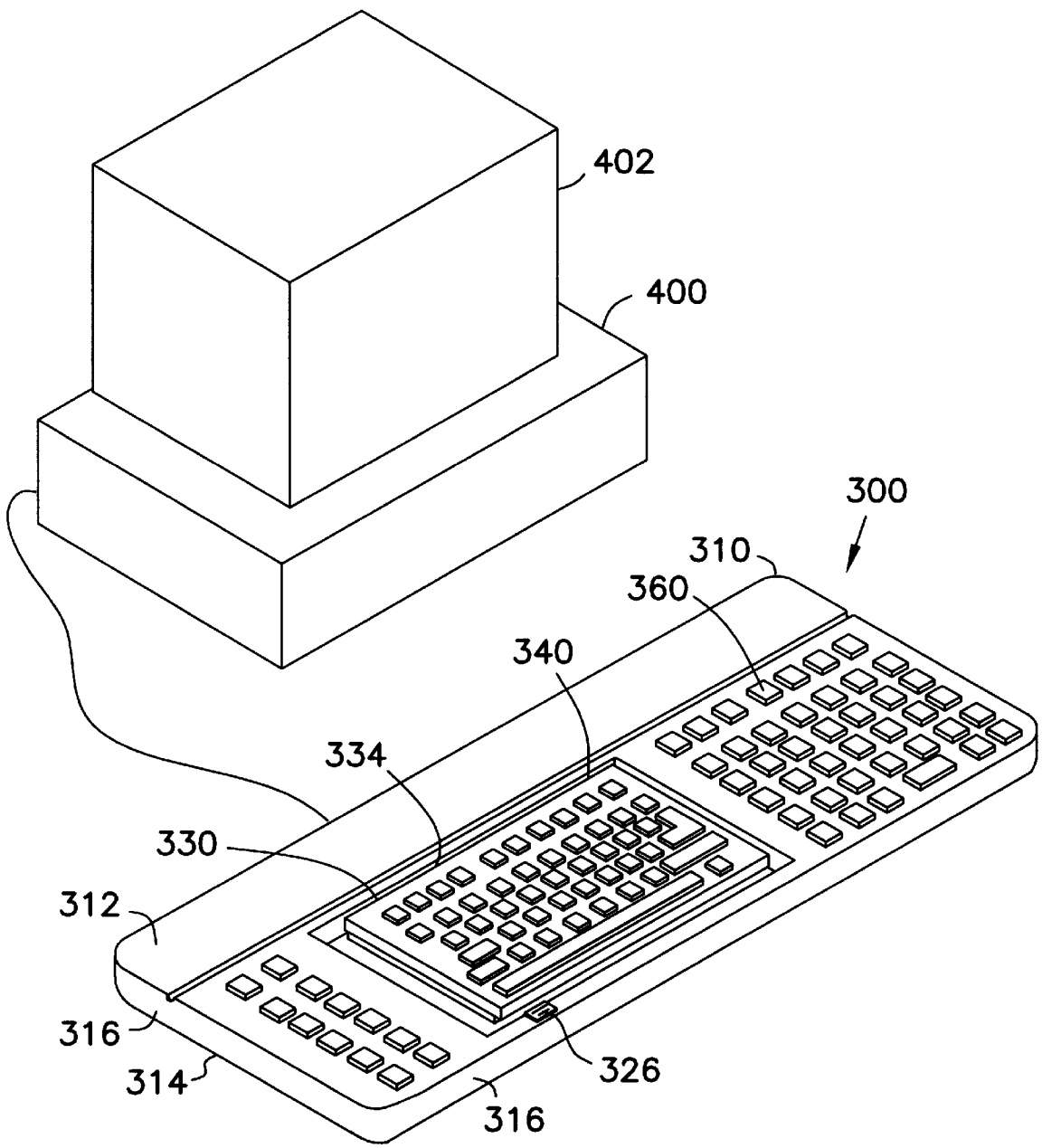
FIG. 5 is a perspective view of a keyboard base and a desktop computer constructed in accordance with one embodiment of the present invention.

Disposed within the cavity 330 is a connector 340. The connector 340 is adapted to couple with the connector 240 of the modular keyboard 200, as will be further discussed below. The keyboard base 300 also has a computer connector 350 for coupling the keyboard base 300 with the computer 400, as shown in FIG. 5. The computer 400 includes a monitor 402, and is coupled with the keyboard base 300. Referring again to FIG. 3, the computer connector 350, in one embodiment comprises a PSE connector, as is known in the art. In yet another embodiment, the keyboard base includes a plurality of keys 360. The plurality of keys 360 can be a numerical keypad, arrow keys, or other function keys. In another embodiment, the keyboard base 300 further includes a removal mechanism 326.

The removal mechanism 326 facilitates the removal and insertion of the modular keyboard 200 from the cavity 330. The removal mechanism 326 comprises, in one embodiment, straps which remain under the modular keyboard 200 or a notch for finger insertion. In another embodiment, the removal mechanism 326 comprises a latch assembly which engages the modular keyboard 200 and retains it within the cavity 330 until the latch assembly is released. Release of the latch assembly is operable to eject the modular keyboard 200. Alternatively, the latch assembly 326 can have a number of other configurations. For instance, the latch assembly or the removal mechanism 326 could be incorporated with the modular keyboard in addition to or instead of on the portable computer 100 and the keyboard base 300. In another embodiment, the latch assembly comprises a spring bias wedge which can be coupled with either the modular keyboard 200 or the portable keyboard 100 and the keyboard base 300.

Figure 4:
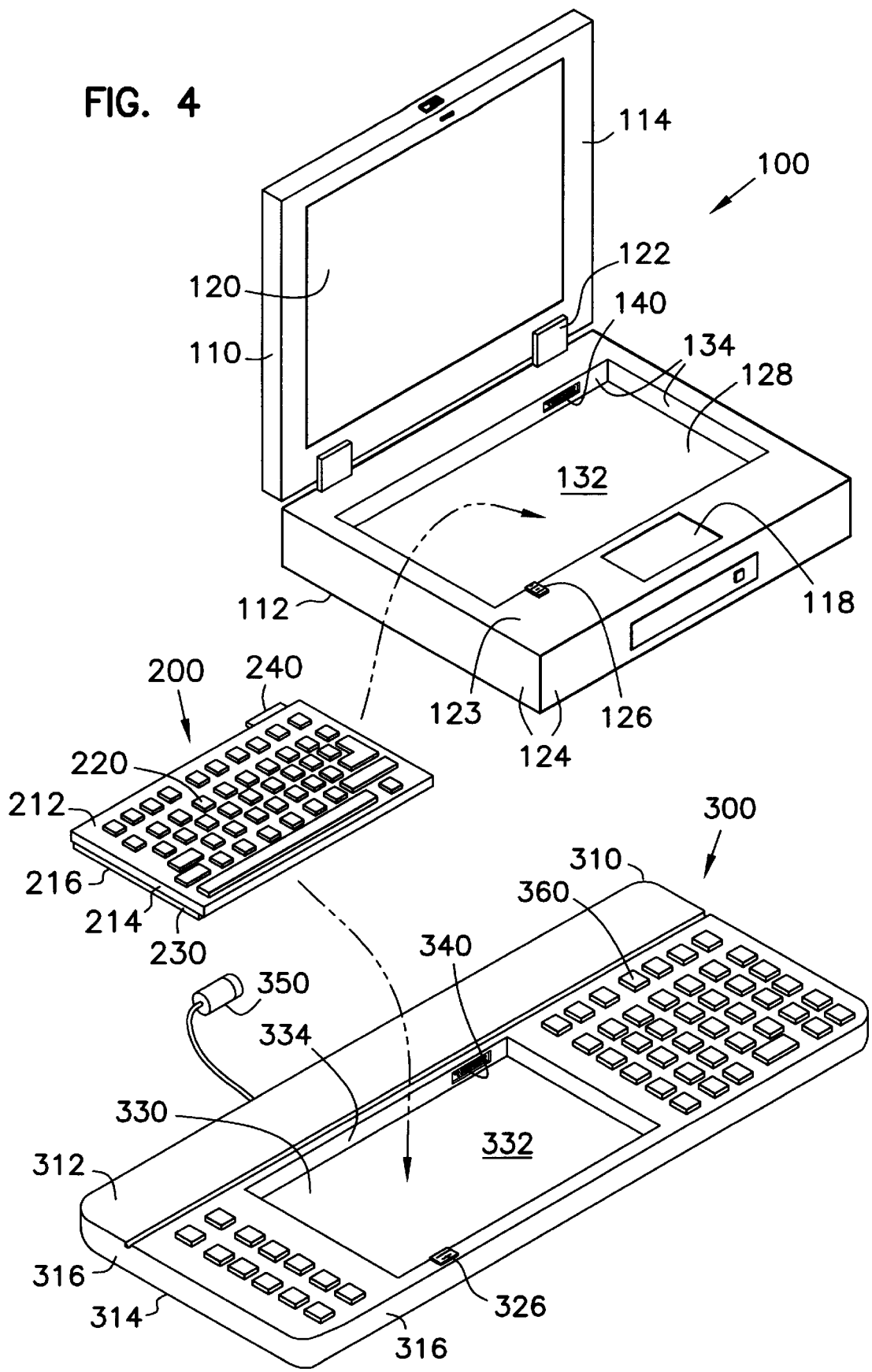
FIG. 4 is an exploded perspective view illustrating a computer system constructed in accordance with one embodiment of the present invention.

During use, the modular keyboard 200 can be placed within the cavity 128 of the portable computer 100 or can be placed within the cavity 330 of the keyboard base 300, as shown in FIG. 4. When the modular keyboard 200 is disposed within the cavity 128 of the portable computer 100, the upper chassis 110 can close and couple with the lower chassis 112 without interference from the modular keyboard 200. In another embodiment, the modular keyboard 200 and the cavity 128 of the portable computer 100 are sized to create a frictional fit between the side surfaces 134 of the cavity 128 and the side surfaces 314 of the modular keyboard 200. The frictional fit facilitates the retention of the modular keyboard 200 within the cavity 128. When the modular keyboard 200 is inserted into the cavity 128, the bottom surface 216 of the modular keyboard 200 rests against the bottom surface 132 of the cavity 128 such that the plurality of keys 220 are all supported by the bottom surface 132 of the cavity 128. This structure provides support even for vigorous keystroking. To remove the modular keyboard 200 from the portable computer 100, the latch assembly 126 is actuated to release the engagement of the modular keyboard 200.

The modular keyboard 200 is then inserted into the cavity 330 of the keyboard base 300. In one embodiment, the modular keyboard 200 and the cavity 330 of the keyboard base 300 are sized to create a frictional fit between the side surfaces 334 of the cavity 330 and the side surfaces 214 of the modular keyboard 200. The frictional fit facilitates the retention of the modular keyboard 200 within the cavity 330 and secures the modular keyboard 200 in place while a user is typing on the keys. When the modular keyboard 200 is inserted into the cavity 330, the bottom surface 216 of the modular keyboard 200 rests against the bottom surface 332 of the cavity 330 such that the plurality of keys 220 are all supported by the bottom surface 132 of the cavity 330. This structure provides support during vigorous typing, by a user. To remove the modular keyboard 200 from the keyboard base 300, the latch assembly 326 is actuated to release the engagement of the modular keyboard 200.

Advantageously, the modular keyboard is light weight and is compatible with both the notebook and desktop computer. The modular keyboard fits within the portable computer, such that the housing of the portable computer can be closed over the keyboard, and the keyboard can be easily toted within the portable computer. In addition, the keyboards provided with either the desktop computer or the portable computer could be customized for customers, yet operable with many different types of computers.

This keyboard design would allow notebook users to keep their entire notebook layout when switching to a desktop keyboard. A user could maintain the learning of the notebook keyboard to a greater extent because the keys used for standard typing tasks would be in the same place for the desktop computer and the portable computer. In addition, the resilient nature of the keys would remain consistent regardless of the device used. A further advantage is that a removable modular keyboard could also be used as a security device, since no data could be input nor retrieved while the keyboard is removed.

It is to be understood that the above description is intended to be illustrative, and not restrictive. Many other embodiments will be apparent to those of skill in the art upon reviewing the above description. For instance, other types of computers could be modified to incorporate the modular keyboard. The scope of the invention should, therefore, be determined with reference to the appended claims, along with the full scope of equivalents to which such claims are entitled.

What is claimed is:

1. A computer system including a desktop computer, the system comprising:

a portable computer comprising;
      a lower chassis having at least a processor and memory therein, where the lower chassis is coupled with a display;
      a body encompassing the lower chassis, the body having a cavity therein;
   a keyboard assembly for use with the desktop computer comprising:
      a keyboard base having a cavity therein, the keyboard base being coupled with the desktop computer, the keyboard base having a plurality of keys coupled therewith; and
   a modular keyboard being removably disposed within the cavity of the keyboard base or removably disposed within the cavity of the body. respectively, the modular keyboard having a plurality of keys coupled therewith.

2. The computer system as recited in claim 1, the lower chassis further comprising a connector disposed within the body cavity, the keyboard base having a connector disposed within the keyboard base cavity, the modular keyboard having a connector, where the modular keyboard connector is removably coupled with the connector of the body cavity or removably coupled with the connector of the keyboard base cavity, respectively.

3. The computer system as recited in claim 1, the cavity of the body having a bottom surface, the cavity of the keyboard base having a bottom surface, the modular keyboard having a bottom surface which is supported by the bottom surface of the cavity of the body or the bottom surface of the keyboard base when the modular keyboard is disposed within the portable computer or the keyboard base, respectively.

4. The portable computer as recited in claim 1, the lower chassis further comprising a latch assembly, the latch assembly is operable to eject the modular keyboard.

5. The portable computer as recited in claim 1, the keyboard base further comprising a latch assembly, the latch assembly is operable to eject the modular keyboard.

6. A modular keyboard in combination with a portable computer and a desktop computer having a keyboard base, each having a connector, the modular keyboard comprising:

a bottom surface having a substantially rigid support structure;
   a top surface having a plurality of keys resiliently coupled therewith;
   side surface, and
   a connector coupled with one of the side surfaces, the connector being coupled with the connector on the portable computer or being coupled with the connector on the desktop computer keyboard base, respective.

7. The modular keyboard as recited in claim 6, the portable computer and the desktop computer keyboard base each further comprising a release mechanism for removing the modular keyboard from a cavity.

* * * * *